3,550,436
METHOD AND APPARATUS FOR ULTRASONIC THICKNESS GAGING OF OBJECTS IN NON-NORMAL ALIGNMENT
Filed April 5, 1968
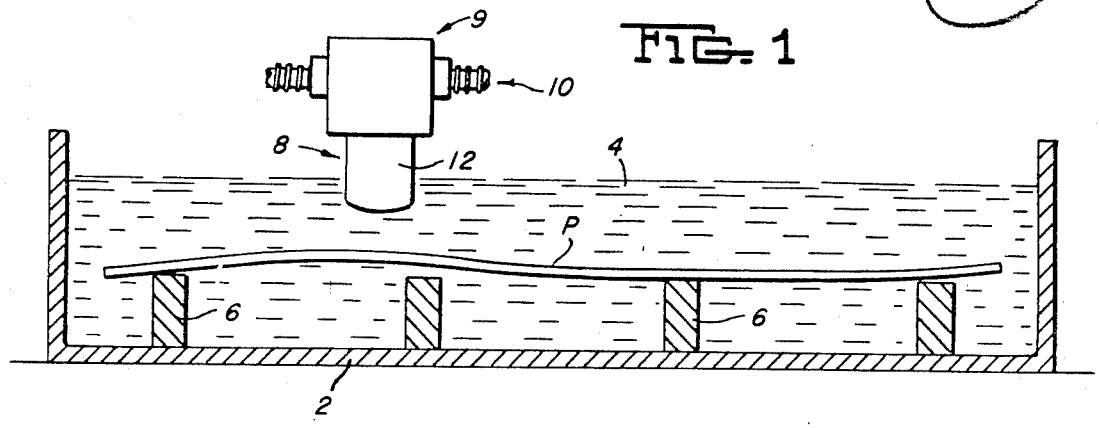
FIG. 1
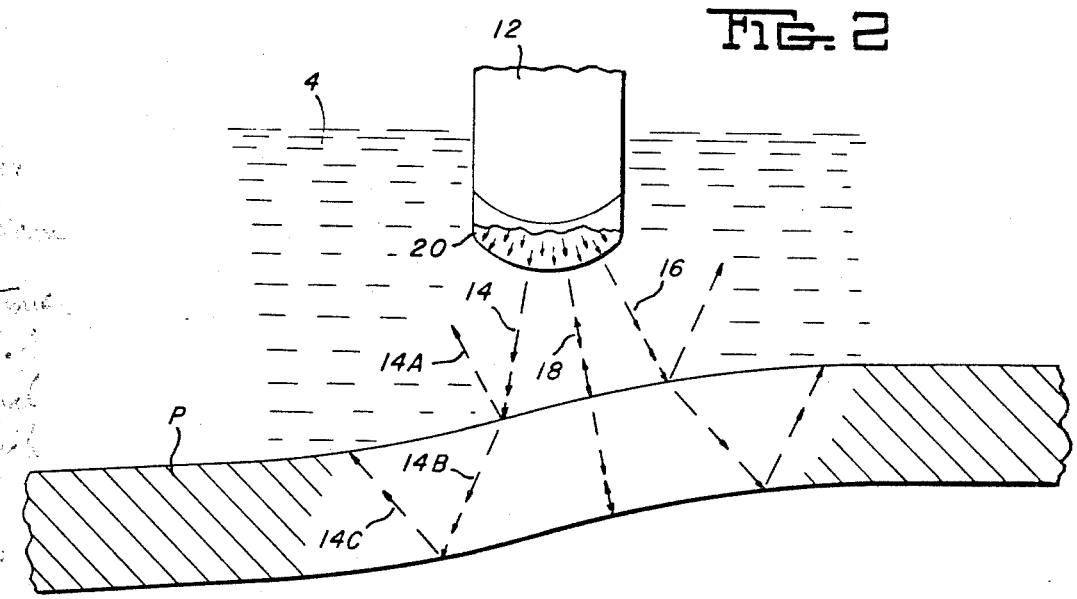
FIG. 2
FIG. 3
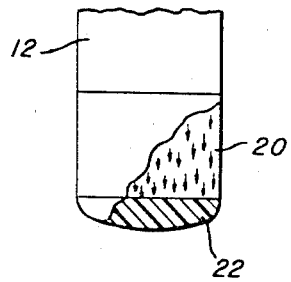
FIG. 4
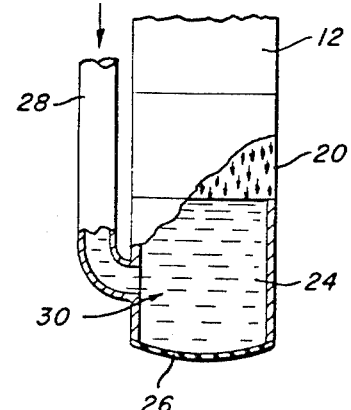
INVENTORS
JOHN A. PATSEY and
DONALD G. SCHINDLER
By Martin J. Carroll
Attorney United States Patent Office 3,550,436
Patented Dec. 29, 1970

3,550,436
METHOD AND APPARATUS FOR ULTRASONIC THICKNESS GAGING OF OBJECTS IN NON-NORMAL ALIGNMENT
John A. Patsey, Penn Hills Township, Allegheny County, and Donald G. Schindler, Whitehall Borough, Pa., assignors to United States Steel Corporation, a corporation of Delaware
Filed Apr. 5, 1968, Ser. No. 719,171
Int. Cl. G01n 29/00
U.S. Cl. 73—67.8     7 Claims

ABSTRACT OF THE DISCLOSURE

Method and apparatus for gaging the distance between two parallel surfaces of an object in which ultrasonic pulses from a transducer are introduced through a liquid coupling medium into the object and reflected back from the surfaces. The end of the transducer is provided with a convex surface so that the pulses are passed into the liquid coupling medium in a divergent beam. Thus, at least part of the pulses will pass into the object and be reflected therefrom perpendicular to its surfaces regardless of whether or not the transducer and object are aligned.

---

This invention relates to ultrasonic thickness measuring and more particularly to measuring the thickness of steel plate, by means of a moving transducer with apparatus of the general type shown in Schindler Pat. No. 3,354,700 dated Nov. 28, 1967. Such apparatus includes a flat faced transducer for introducing ultrasonic pulses or waves parallel to the transducer axis into the workpiece and means for receiving and analyzing reflected waves from the workpiece to determine thickness. For accurate gaging it is necessary that the flat faced transducer be aligned parallel to the surfaces defining the thickness to be measured. Such alignment insures that the maximum amount of ultrasonic energy is projected into and reflected from the plate along a line substantially normal to the top and bottom surfaces of the plate to provide accurate gaging and also insures sufficient reflected energy to activate the gage. However, rolled plates or strip are not perfectly flat, but are warped, wavy and/or bent. When measuring the thickness of such plate, the reflections and refractions of the ultrasonic energy will produce inaccurate and unreliable readings unless the transducer face is realigned for each reading. This has been done manually, but such realignment is expensive and the results obtained are often unsatisfactory.

According to our invention, we transmit the ultrasonic pulses into the liquid coupling medium in a divergent beam so that at least a part of the ultrasonic pulse and its reflections travel along a line normal to the surfaces of the object being gaged and back to the transducer regardless of variation in the object.

It is therefore an object of our invention to provide a method and apparatus for ultrasonic thickness measurement with improved accuracy and reliability.

Another object of our invention is to provide such a method and apparatus which automatically compensates for warps and bends in the object being measured.

Still another object is to provide such a method which eliminates the need for accurate initial alignment of the transducer and also the need for realignment during operation.

These and other objects will be more apparent after referring to the following specification and attached drawings, in which:

FIG. 1 is a schematic sectional general view of apparatus for ultrasonic thickness measurement using the invention;

FIG. 2 is a schematic sectional view illustrating the preferred transducer arrangement and the method of operation of our invention;

FIG. 3 is a schematic sectional view of a second transducer arrangement for carrying out the invention; and FIG. 4 is a schematic sectional view of a third transducer arrangement for carrying out the invention.

Referring more particularly to the drawings, reference numeral 2 indicates a tank containing water 4. Supports 6 are provided in the tank 2 for supporting a plate P beneath the water. An ultrasonic thickness measuring gage 8 of the type disclosed in Schindler Pat. No. 3,354,700 dated Nov. 28, 1967, is mounted on a carriage 9. Carriage 9 is moved over the plate both longitudinally and laterally on a frame 10, partially shown, to make thickness measurement over the entire area of the plate. The parts so far described are conventional.

According to our invention we introduce the ultrasonic pulses into the liquid medium 4 in a divergent pattern as shown in FIG. 2 in such a manner that a realignment between the surfaces of the plate P and the axis of the transducer mount and pulse source 12 is not necessary. If the ultrasonic pulses follow the path 14, a component 14A will be reflected off the near surface of the plate P and will not return to the source 12. Another component 14B will be refracted into the plate P and reflected off the far surface of the plate P as component 14C. Component 14C will not return to the source 12. Since neither components 14A and 14C will return to the source 12 they will not be used by the gage for determining the length of component 14B. Component 14B is not normal to the surfaces of plate P and is therefore not a true indication of the plate thickness. In the same manner other paths such as path 16 would not represent the true thickness and do not have components reflected back to the source 12. However, since path 18 is normal to the surfaces of plate P, all components of the ultrasonic pulses radiating on this path will return to the source 12 to activate the gage. As the gage 8 is moved over the plate P it will thus pick out a normal path for measuring regardless of the alignment of the source 12 and the plate P.

In the preferred embodiment of our invention, shown in FIG. 2, the ultrasonic pulses are radiated in a divergent beam by a curved transducer 20. The transducer is made of ceramic, fired, ground to a convex radiating surface and then piezoelectrically aligned normal to the convex surface as illustrated by the arrows in the partial section of the transducer 20. The piezoelectric alignment tends to radiate the ultrasonic pulses in the direction of the alignment. The curvatures of the transducer 20 and bends of the plate P as shown have been exaggerated for the purpose of illustration.

In the embodiment of FIG. 3, a convex lens 22 contacts a conventional transducer 20 which is piezoelectrically aligned as shown. The lens, made of a material which minimizes attenuation of the ultrasonic pulses, such as plastic, radiates the ultrasonic pulses in a divergent beam.

In the embodiment of FIG. 4 the outer end of transducer 20 is connected to a reservoir 24 having a very thin flexible membrane 26 at its outer end and a conduit 28 for supplying a liquid 30 such as glycerine which propagates sound at a velocity different than that of the coupling medium 4. When pressure is applied through conduit 28 membrane 26 is bulged outwardly thereby creating a liquid convex lens. The membrane 26 provides no pulse lengthening due to acoustic delay introduced by thickness and hence provides better pulse-pair resolution than the plastic lens.

While several embodiments of our invention have been shown and described, it will be apparent that other adaptations and modifications may be made without departing from the scope of the following claims.

We claim:

1. In a method of measuring the thickness of a flat object subject to slight waviness and having generally parallel surfaces in which an ultrasonic pulse from a transducer is introduced through a liquid coupling medium into the object from one of said surfaces, and the times for the reflections of the ultrasonic pulse to travel between said surfaces are measured; the improvement which comprises passing the ultrasonic pulse into the liquid coupling medium in a radially divergent beam, and timing only those reflections which pass between said surfaces and from the surfaces into the transducer along a line substantially normal to the surfaces.

2. The method of claim 1 in which the angle between the said surfaces and the axis of the transducer varies.

3. In apparatus for measuring the distance between generally parallel surfaces of a flat object subject to slight waviness, including a transducer for introducing ultrasonic pulses through a liquid coupling medium into the object from one of said surfaces, the ultrasonic pulses being reflected from said surfaces back into the transducer; the improvement which comprises pulse diverging means including a convex surface in contact with the liquid coupling medium, whereby only those reflections which pass between said surfaces and from the surfaces into the transducer along a line substantially normal to the surfaces will be timed.

4. Apparatus according to claim 3 in which said pulse diverging means includes a lens having a flat surface in contact with the transducer and a convex surface in contact with the liquid coupling medium, said convex surface being generated by the rotation of a curved line.

5. Apparatus according to claim 3 in which said pulse diverging means includes a reservoir connected to said transducer and having a flexible membrane at its outer end, and a liquid under pressure in said reservoir having a velocity of sound propagation greater than that of the coupling medium, said liquid expanding said membrane to form said convex surface.

6. Apparatus according to claim 3 in which said convex surface is radially formed on the end of said transducer and the transducer is piezoelectrically aligned to radiate ultrasonic energy at right angles to the convex surface.

7. Apparatus according to claim 5 in which said reservoir liquid is glycerin and said coupling medium is water.

References Cited

UNITED STATES PATENTS

| | | | |
|---|---|---|---|
| 3,168,659 | 10/1965 | Bayre et al. | 73—67.5X |
| 3,354,700 | 11/1967 | Schindler | 73—67.9 |
| 3,379,051 | 4/1968 | Zeutschel et al. | 73—67.9 |

RICHARD C. QUEISSER, Primary Examiner

A. E. KORKOSZ, Assistant Examiner